United States Patent

Krause et al.

[15] 3,705,597
[45] Dec. 12, 1972

[54] CONTINUOUS CONTROL FOR INTRODUCING MATERIAL INTO A FLOWING LIQUID

[72] Inventors: Ronald O. Krause, Waukesha; Peter D. Bayne, Shorewood, both of Wis.

[73] Assignee: Nutrico, Inc., Milwaukee, Wis.

[22] Filed: Feb. 26, 1971

[21] Appl. No.: 119,087

[52] U.S. Cl..............................137/101.21, 251/205
[51] Int. Cl..............................................F16k 19/00
[58] Field of Search.............137/101.19, 101.21, 114

[56] References Cited

UNITED STATES PATENTS 3,038,486   6/1962   Thurman.....................137/101.21 X
3,049,142   8/1962   Oliver..........................137/101.21 X Primary Examiner—Robert G. Nilson
Attorney—Andrus, Sceales, Starke & Sawall

[57] ABSTRACT

A turbine meter is supported within a housing and produces signal pulses proportional to flow. An injector valve to the input side of the meter is connected to a pressurized additive tank through a linear valve. The valve includes a tapered shaft axially positioned in a flow orifice. A converter converts the pulses to an analog signal. A set point generator establishes a scaled signal which is connected with a line pressure compensating signal and the analog signal to an amplifier to produce an analog error signal driving a servomotor to position the linear valve shaft and a feedback potentiometer. A slotted connection to the valve shaft permits relative axial shaft adjustment for accurate setting relative to the potentiometer. The feedback signal is summed with the error signal to correspondingly position the valve. The servomotor unit and the control valve are secured within the housing with the additive tank to be releasably secured to the top wall. A minimum flow valve is connected in the additive flow line to selectively stop flow of additive.

10 Claims, 5 Drawing Figures

PATENTED DEC 12 1972

FIG_5

FIG_1

INVENTORS
RONALD O. KRAUSE
PETER D BAYNE
BY
Attorneys

INVENTORS
RONALD O. KRAUSE
PETER D. BAYNE
BY
Attorneys

CONTINUOUS CONTROL FOR INTRODUCING MATERIAL INTO A FLOWING LIQUID

BACKGROUND OF THE INVENTION

This invention relates to a continuous control of material added to a liquid flow and, in particular, in accordance with the liquid flow rate.

In various processes, a small amount of a second material is desirably added to and blended with a relatively large and rapidly flowing liquid stream. For example, in the processing of various liquid foods such as fruit juices, beer, soft drinks and the like, liquid sterilizing agents have recently been suggested as a substitute for the more traditional heat-sterilization of the liquid during the processing. A particularly satisfactory system and apparatus is shown in U.S. Pat. No. 3,506,460 to Peter D. Bayne, one of the co-inventors of the subject invention. As more fully disclosed therein, a small amount of a sparingly soluble sterilizing agent is introduced and blended with the flow stream of the liquid perishable material prior to the packaging thereof. An injector unit is mounted in the main stream flow line and is interconnected through a valved line to a storage unit. In this manner, small amounts of the sterilizing agent are introduced into the flowing liquid. An in-line blender is preferably provided immediately following the injector unit to agitate the liquid and the sterilizing agent and insure full dissolving of the sterilizing agent in the liquid. In order to provide accurate control of the amount of the sterilizing agent, a flow sensing means is connected in the main flow line and produces a signal which is coupled through a suitable converter to control the setting of a flow valve in the sterilizing agent flow line. The valve is shown as a motor-operated variety or the like which is opened and closed in accordance with the flow rate to maintain a predetermined flow.

Applicants have found that the flow rate may vary substantially and rapidly and that the apparatus presently employed in additive controls do not produce a highly accurate proportion of additive material to the liquid flow, particularly at extremely low ratios. Thus, as noted in the above Bayne patent, in the sterilization of liquid food products and the like, extremely low ratios of additive to base liquid flow are employed. Typically, the sterilizing agent added to the perishable material is in the range of 0.000122 grams per liter. Although pumping and batch loading have also been suggested, they are not sufficiently accurate where parts per million type injection rates on a continuing basis are required such as in the application for sterilization of food products.

SUMMARY OF THE INVENTION

The present invention is particularly directed to a reliable and practical control apparatus and system for accurately and precisely metering preselected relatively minute portions of an additive material to a flowing liquid on a continuous basis and, in particular, to a cold sterilization process for sterilizing perishable food products such as malt beverages, soft drinks, wine, fruit juices and other similar liquid products.

Generally, in accordance with the present invention, a flow-sensing means is connected in the main flow line and establishes a related control signal which is fed to a suitable signal comparator and amplifying circuit means to establish an operating control signal. The error signal is connected to a servomotor which, in turn, is connected to position a control valve and in accordance with the present invention simultaneously to position a related feedback signal generator which produces a signal related to the valve position. The control valve, in turn, is selected as a linear positioning valve whereby each unit change in the position of the valve establishes a corresponding change in flow such that the position of the valve accurately determines the amount of flow. The output of the generator is connected into the amplifying means and summated with the flow related signal and a set point signal established by a set point signal unit. The latter signal unit establishes a signal corresponding to that of the flow sensing means and the feedback generator when the desired ratio of the additive to the liquid flow is present. The circuit thus compares the three signals consisting of the set point signal, the flow-rated signal and the feedback signal to produce a closed loop drive of the valve servomotor with a corresponding accurate positioning of the control valve.

Applicant has found that the multiple signal control provides a very accurate and reliable means of metering an additive to a flowing liquid and in particular provides an unusually satisfactory control for the metering of minute amounts of a liquid sterilizing agent to a liquid food product.

In accordance with another aspect of the present invention, a minimum flow rate auxiliary control valve is connected in the additive flow line and responds to a minimum flow rate through the main flow line to terminate the feeding of the additive material to the flowing liquid.

In accordance with a particularly novel construction of the present invention, a flow meter is connected in the flow line and establishes a digital output signal in accordance with the liquid flow. The signal is applied to the converting and amplifying circuitry where it is converted to an analog signal. A set point generator establishes an appropriately scaled set point signal which is connected through a pressure compensating means to the converting and amplifying circuitry. The pressure compensating means compensates for the back pressure of the process flow line which will affect the interrelationship between the set point signal and the flow-related signal. The output of the amplifying circuitry is thus an analog signal related to the comparison of the set point signal and the flow-related signal. This is connected to and drives the servomotor to correspondingly position the control valve and a linear precision feedback signal means such as a potentiometer. The feedback signal is a related analog signal which is fed back to the amplifying circuitry and compared with the summation of the set point signal and the flow-related signal to insure accurate drive and position of the servomotor. Applicants have found that this system permits extremely accurate metering of relatively small amounts of an additive to continuous flowing liquid.

In another aspect and practical application of the present invention, the flow control system is formed as an integrated unit with a common housing structure having suitable coupling means for direct connection into the main process flow line. Generally, a turbine meter is supported within the housing with an injector valve unit connected to the input side of the flow meter. The line couplings are connected to the injector unit and to the output end of the flow meter. The servomotor unit and additive tank are secured to the upper end of the housing and connected through a suitable conduit means including the desired check valve and metering valves to the injector unit. The electronic control circuitry is mounted in a separate chamber on suitable printed circuit boards. The input is connected to the signal line from the flow meter and externally to the servomotor, one end of which is coupled to the metering valve and the opposite end of which is coupled to a linear precision potentiometer. The set signal generator and the pressure compensator are mounted within the control chamber of the housing and provided with suitable adjustable means for presetting thereof in accordance with the desired additive flow rate and the back pressure of the flow system.

In accordance with a further novel aspect of the present invention, the converting and amplifying circuitry employs a differential amplifier. One input is connected to the converted analog signal related to the flow rate and the opposite of which is connected to the set point signal. The output of the differential amplifier is an analog signal related to the desired additive rate. This is compared with the feedback signal from the potentiometer to generate an error signal for driving of the flow control rate servomotor.

The present invention provides a highly accurate metering flow control, particularly adapted for the addition of relatively minute quantities of an additive to a flowing liquid of a perishable material in a continuous manner and in response to varying rates of flow.

BRIEF DESCRIPTION OF THE DRAWINGS

The drawings furnished herewith illustrate the best mode presently contemplated for carrying out the subject invention and clearly discloses the above advantages and features as as well as others will be readily understood from the following description.

In the drawing:

FIG. 1 is a block flow and control diagram showing the invention applied to the addition of a liquid sterilizing agent to a main flowing liquid product;

FIG. 5 is a schematic circuit diagram showing a preferred construction of the signal converter and amplifying circuit shown in FIG. 1.

DESCRIPTION OF THE ILLUSTRATED EMBODIMENT

Figure 2:
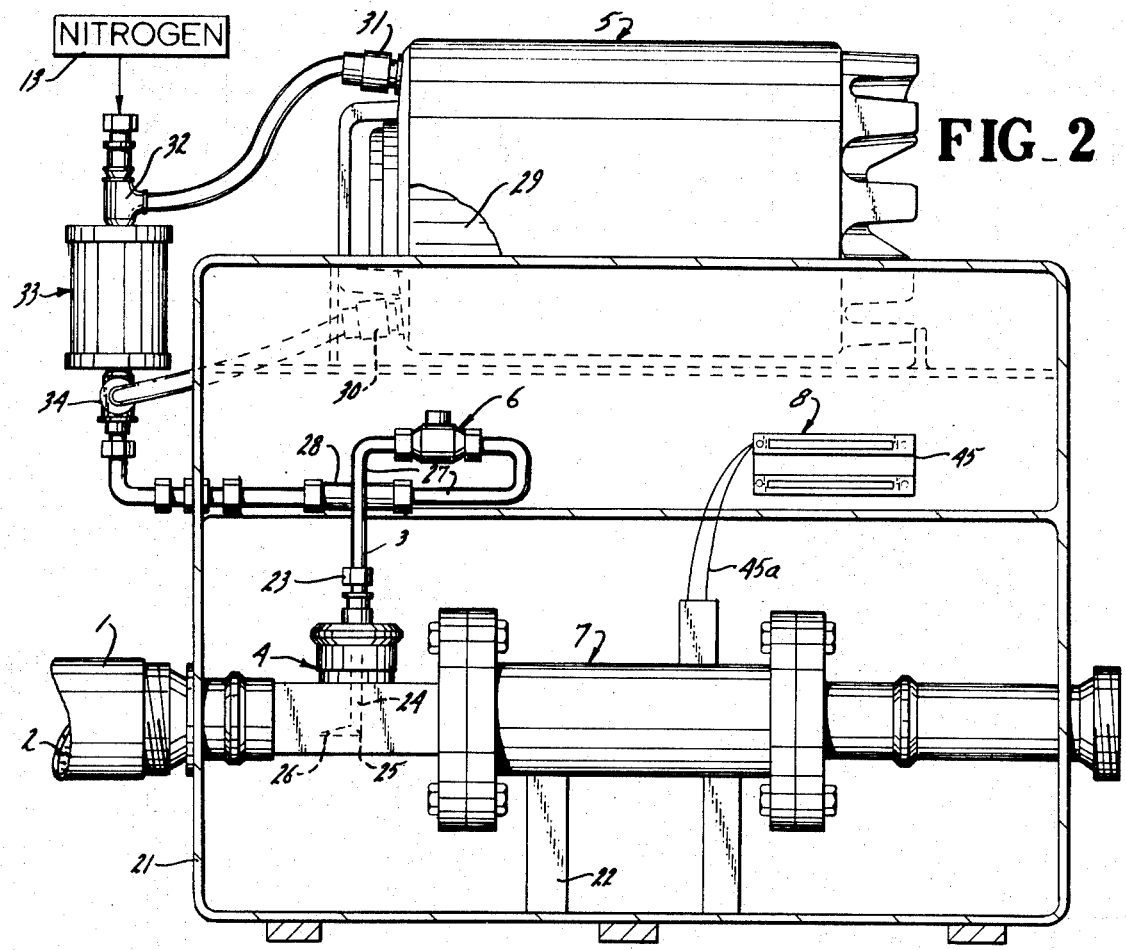
FIG. 2 is a side elevational view of a preferred mechanical construction of the apparatus shown in FIG. 1.

Referring to the drawings and particularly to FIG. 1, a main liquid flow line 1 is shown for carrying a perishable liquid such as beer, fruit juice, soft drinks, wine or the like from a source 2 to any suitable further processing means, not shown. A sterilizing agent additive line 3 is connected to the line 1 through an injection unit 4 to supply small amounts of a liquid sterilizing agent from a pressurized additive source 5 to the liquid flowing through line 1. A control valve 6 controls the amount of liquid additive supplied to unit 4. The liquid sterilizing agent may, for example, be a diethyl pyrocarbonate or mixed anhydrides or the like which when dissolved in the perishable liquid, eliminates the necessity for the usual subsequent heat sterilization. Generally, in accordance with the present invention, a flow meter 7 is connected to the line 1 immediately downstream of the injector unit 4 and establishes an electrical output signal which is applied via a line 8 to a signal converting and amplifying circuit 9. A set point signal generator 10 establishes an electrical signal scaled to the signal output of the meter and is connected to a second input line 11 to the circuit 9.

A pressure compensator 12 is also connected to the signal converter and amplifier 9 to compensate for the pressure in the main flow system and particularly line 1.

The sterilizing agent within the source or tank 5 is maintained under a predetermined constant pressure, such as from a fluid pressure supply means 13. The valve 6 is a linear valve unit such that the flow of the sterilizing agent through the additive line 3 is precisely related to the constant pressure, the sized opening of the valve 6, and the back pressure of line 1.

The preset and flow related signals are compared and generate a difference signal at an output line 14 which, in turn, is interconnected to drive a special servomotor assembly 15 for positioning of valve 6. Generally, assembly 15 includes a servomotor 16 coupled to control the position of the additive valve 6 and also coupled to correspondingly position a feedback potentiometer 17. The control valve 6 may be any suitable linear-type valve such as a spring-loaded variable orifice valve shown in FIG. 4, which will permit accurate metering in accordance with the opening of the valve, as more fully described hereinafter. The motor 16 thus opens and closes the valve 6 to vary the additive flow from the source 5 to the injector unit 4 to thereby adjust the quantity or amount of the sterilizing agent fed to the main line 1.

The motor 16 simultaneously positions the feedback potentiometer 17 to establish an analog signal directly related to the opening of the valve 6 as determined by the position of the servomotor 16. The potentiometer output signal is also connected via a line 18 to the converter and amplifying circuit 9 and summated with the difference signal to establish an error signal equal to difference between the sensed error and the error in the setting of the valve 6 and thereby create precise movement of the servomotor 16 and a corresponding positioning of the control valve 6 until the error signal is effectively zero.

A suitable blender 19 is connected in the main flow line 1 and is preferably a suitable static blender to fully mix the additive and the main liquid.

A cutoff valve 20 is shown inserted in the additive flow line 3 between the control valve 6 and the injection unit 4. The valve 6 may be a solenoid-actuated valve or the like interconnected to the signal converted and amplifying circuit 9. If the output of the meter 7 drops to indicate a predetermined minimum flow rate in the main flow line 1, the valve 3 is actuated to close the additive flow line and terminate the flow therethrough.

Thus, in the operation of the illustrated system, the operator sets the set point generator 10 and the pressure compensator 12 in accordance with the particular characteristics of the flow line and the desired additive rate. The modified preset signal is compared to the output of the turbine meter 7 and provides a drive for the opening of the linear control valve 6 in accordance with the preset amount. In addition, an inner control loop is provided by the feedback potentiometer 17 to insure accurate positioning of the servomotor in accordance with the error signal. The linear control valve 6 provides a very precise metering while the feedback system is based on the valve position rather than any special sensing of the actual additive flow rate. This is particularly desirable and provides a more accurate control than was obtained by determination of the small amount of flow of the additive material. If the main liquid flow should drop below a predetermined level, the output actuates the cutoff valve 20 to terminate the additive flow.

As more fully disclosed in the previously referred to Bayne U.S. Pat. No. 3,506,460, the sterilizing agent tank 5 is preferably maintained at a pressure of at least 5 pounds per square inch and preferably in the range of 25 to 35 pounds per square inch above the pressure of the beverage in line 1. The storage tank 5 is preferably pressurized by an inert gas such as nitrogen which is introduced into the storage tank or the head space of the tank from a suitable pressure source which is preferably a regulated pressure source to maintain the desired pressure conditions in the storage tank and therefore on the additive in the flow line.

Figure 3:
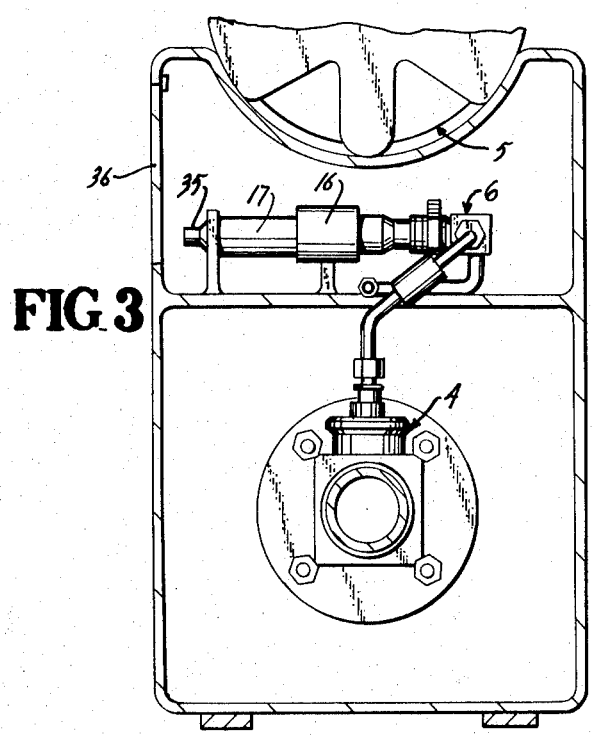
FIG. 3 is a partial end view of the apparatus shown in FIG. 2 with the housing broken away to show the inner details of construction.
Figure 4:
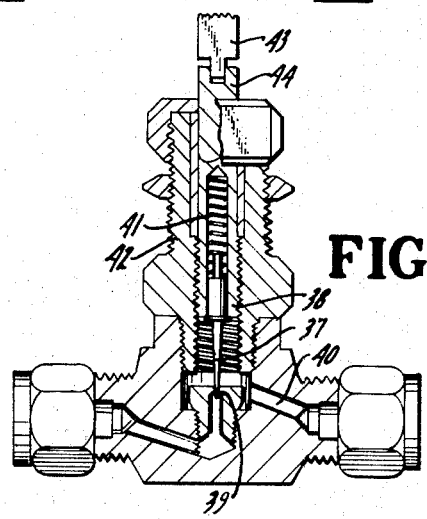
FIG. 4 is an enlarged sectional view through a motor driven servo-valve shown in FIGS. 2 and 3.

Although the apparatus can be packaged in any desired manner, a highly satisfactory unit including a preferred linear type control valve is shown in FIGS. 2 – 4, wherein the corresponding elements of FIG. 1 are similarly numbered. A generally rectangular housing or cabinet 21 supports the metering and flow control valves with an additive storage tank 5 releasably mounted upon the upper wall of the housing.

The turbine meter 7 is mounted within the lower portion of the housing 21 on a suitable supporting structure 22 with the additive injector unit 4 mounted immediately to the downstream side thereof. Suitable connecting conduits or pipes are secured to the opposite ends of the meter 7 and injector meter unit 4 and project outwardly from the opposite ends of the housing 21 to permit interconnection into the processing line 1.

The injector unit 4 may be preferably constructed in the same manner as that disclosed and taught in the Bayne U.S. Pat. No. 3,506,406 including a small check valve 23 in the inlet end thereof. Generally, the injector unit 4 includes a conduit 24 depending into the stream and terminating in a resilient head unit 25 having a narrow slit 26 generally aligned with the flow axis of the injection unit. The slit 26 provides a positive shutoff in the event of a malfunction and prevents the perishable liquid of the line 1 from backing into the additive flow line.

The metering valve 6 is secured in the upper portion of the housing and particularly above an intermediate supporting wall. The metering valve 6 is interconnected by suitable conduit means 27 to the injection unit 4 and to an in-line filter 28. The input to the in-line filter 28 extends outwardly through the end wall of the housing 21 through a suitable conduit assembly and is connected by a releasable connector 30 to the lower end of tank 5 to the additive tank 5 within which the additive 29 is held under a preselected constant pressure. The storage tank 5 is secured to the upper wall of the housing in a suitable saddle structure and releasably clamped to the housing 21 by suitable interconnecting clamp means.

The nitrogen or other gaseous supply 13 for pressurizing of the additive tank 5 is connected to the upper end of the tank 5 through a suitable releasable coupling 31. A two-way coupling 32 is connected in the connection to supply 13 and provides a corresponding pressure to the top side of a sightglass unit 33 to simultaneously maintain a corresponding pressure in the sightglass unit and in the storage tank 5.

The opposite end of sightglass unit 33 is connected to the additive output line by a two-way coupling 34 to provide to continuous visual check on the availability of the additive.

As shown in FIG. 3 the servomotor 16 is secured within the upper chamber of the housing 21 with the output shaft of the motor 16 coupled to the servo-valve 6. A potentiometer 17 is secured to the opposite end of the shaft of motor 16.

An adjustable control knob 35 is coupled to the potentiometer to permit manual adjustment and setting of the assembly.

The housing 21 includes a removable side wall cover 36 to permit access into the complete control assembly.

As previously noted, the valve 6 may be any suitable linear valve. Applicants have found that particularly satisfactory valve units are obtained with a pin type control valve such as the manually actuated micro-metering valves 22RS4 sold by Whitey Research Tool Co. of Emeryville, Cal. A modification of such a valve for the present invention is shown in FIG. 4. Generally, the valve includes an accurately tapered rod 37 slidable mounted within a positioning stem 38 with the lower end located within a control orifice 39. The flow passageway 40 extends laterally of the orifice chamber and the rod. The tapered rod 37 is coupled to a positioning shaft or stem 38 through a loading spring 41. The positioning stem 38 is threaded into the valve housing 42 to move and position the tapered rod 37 in the orifice in accordance with the rotation of the input or motor shaft 43 with the precise position of the tapered rod 37 directly controlling the effective orifice opening and therefore the flow. In this valve, the valve rod 37 does not rotate upon seating and is precision formed to permit accurate setting of the orifice opening. Further, and of particular significance in this application for adding of the additive to beer and the like the tapered rod 37 and orifice 38 are accurately machined to establish a linear relationship between the position of the tapered rod 37 and the flow rate through the orifice over a given pressure range.

In the illustrated embodiment of the invention, the particular described valve is modified and coupled through a releasable slotted shaft connector 44 to the servomotor 16 to permit movement of the valve rod assembly axially of the motor shaft. The potentiometer 35 is also coupled to the motor shaft to maintain accurate interrelated movement and positioning of the interconnected tapered rod 37 and the setting of the potentiometer 17 as a result of the rotation of the servomotor 16.

The spring coupling between the positioning shaft 38 and the tapered rod 37 prevents undue or damaging loading of the tapered rod and permits over-zero positioning. Thus, in the initial adjustment of the valve unit, the servo system can be adjusted to a zero position and the valve then manually positioned to provide an accurate zero closure of the control valve.

The electronic control circuitry is housed within the upper chamber of the housing and is preferably formed with printed circuit boards 45 releasably mounted within the upper portion of the housing 21 for convenient removal for servicing, maintenance, replacement and the like. The flow meter 7 is connected into the circuit through a suitable signal line or lines 45a extending upwardly outwardly from the turbine meter 7 to the circuit boards.

As previously noted, the signal converting amplifier may be of any suitable circuit construction which will receive the digital input signal or other signal generated by the flow responsive meter and compare such signal to the set point signal to provide an error signal in accordance with the desired and the actual flow. The circuit further must include means to compare the error signal with the linear potentiometer feedback signal created by the driving of the servomotor 16 to adjust the position of the valve 6 to correspond to the desired position.

A satisfactory and novel circuit is shown in FIG. 5, the particulars of which is the subject matter of the copending application of the joint inventors Krause and Bayne bearing Ser. No. 119,086 and filed on Feb. 26, 1971 entitled "Signal Converter and Amplifier for Metering Additive Flow."

Referring particularly to FIG. 5, the signal converter and amplifying circuit 9 includes a pickup channel 46 for converting the output of the turbine meter 7 into a related analog signal, which is compared with the preset signal of the set point generator 10 and applied to one side of a comparator channel 47. The opposite side of the comparator channel 47 is connected to the feedback potentiometer 17 which is connected in circuit with a suitable pressure and calibration adjustment means.

More particularly, as shown in FIG. 5, the turbine meter 7 includes a pickup coil 48 associated with a magnet core 49. The rotor 50 of the turbine meter 7 includes a rotating magnetic control device 51 such that the rotation of the unit generates one or more pulse signals in the coil 48 for each revolution. Thus, the output of the turbine meter 7 appears at the coil 48 as a series of time-spaced induced voltage signals related directly to the rotational rate of the turbine meter rotor, which, in turn, is directly related to the volumetric flow. The output of the coil 48 is connected through a resistive coupling network 52 to the input of an amplifier 53 having its output capacitive-coupled to the primary of a detector transformer 54. A pair of diode rectifiers 55 are connected to the opposite ends of the secondary winding 56 of transformer 54 and are similarly polarized with respect to a common output terminal 57 to establish a fullwave rectified voltage with respect to a grounded center tap connection 58. The fullwave output provides a related direct current signal connected through a coupling resistor 59 to the inverting input of an operational amplifier 60. A stabilizing feedback potentiometer 60a interconnects the output of the amplifier 60 to the input to establish an operational amplifying network, the output of which is a direct current signal proportional to the flow rate. A resistor and a bypass filtering capacitor 61 to ground connects the output to the non-inverting input of a second operational amplifier 62, the other input being interconnected through a feedback line 63 to the output. The resistor-capacitor 61 will filter spurious transient signals and the like from the output stage and thus result in driving of the amplifier 62 in accordance with the converted analog flow-related signal.

The output signal is applied across a proportioning potentiometer 64 connected between the output of the amplifier and ground. The potentiometer 64 includes a tap 65, connected as an input to channel 47 through a manually operated test switch 66. The tap 65 is coupled to the control knob 35, shown in FIG. 3. The setting of the potentiometer 64 determines the proportion of the flow-related voltage employed as an input to actuate the servo system and thereby permits adjustment of the amount of additive for any given flow in accordance with a desired range. Generally, the potentiometer 64 is a precision linear potentiometer which may be calibrated in parts per million to permit direct setting of the additive in parts per million for any given flow rate.

The output tap 65 of the potentiometer is coupled at one input to the non-inverting input of an operational amplifier 67 of channel 47 with a further stabilizing capacitor 68 connecting the potentiometer tap 65 to ground. The output of the amplifier 67 is connected as one input of a servo-drive amplifier 69 by a precision resistor 70, the output of which is connected to control the energization of the servomotor 16 as presently described.

Amplifier 69 is an operational amplifier having a suitable resistor-capacitor feedback network 71 connected to the inverting input of amplifier 69.

A feedback amplifier 72 similar to the flow-related signal amplifier 67 has a corresponding non-inverting input connected to the tap 73 of the servo-driven potentiometer 17. Tap 73 is coupled to and positioned by the servomotor 16 to establish a signal proportional to the opening of valve 6. The one side of the potentiometer 17 is grounded and the opposite side is connected in series with a pressure adjustment potentiometer 74 and a calibrating potentiometer 75 to the positive side of a d.c. power supply. A span adjustment potentiometer 76 is shown connected in parallel with the pressure adjusting potentiometer 74.

In the operation of the circuit, the input to the feedback servo-position related amplifier 72 establishes an output in accordance with the position of the servomotor 16 and therefore the additive control valve 6. The output of the amplifier 72 is coupled through a precision resistor 77 to the summing input of the servo-drive amplifier 69 in common with the output of the flow-related drive amplifier 67. The opposite input of the amplifier 69 is grounded through a precision resistor 78. The operational amplifier includes the feedback network 71 which has a potentiometer 79 in series with a fixed resistor 80 interconnecting the output of the amplifier to the summing input. A small filtering and shaping capacitor 81 is connected in parallel with the fixed resistor 80. The output of the amplifier 69 is a polarity-related d.c. signal directly proportional to the algebraic summation of the output of the feedback amplifier 72 and the flow-related amplifier 67. The output of the amplifier 69 is connected to energize a polarity sensitive relay 82.

The relay 82 is shown schematically as a single pole, double-throw unit having a common pole 83 connected to one side of an alternating current power supply and selectively engaging a forward drive contact 84 and reverse drive contact 85. The contacts 84 and 85 are connected to selectively energize the servomotor 16, the opposite of which is connected to the opposite side of the alternating current power supply.

The servomotor 16 is shown as a conventional servomotor having a pair of windings 86 and 87 connected in common at one end to the alternating current power supply line. The opposite ends of the windings 86 and 87 are connected directly to the forward drive contact 84 and the reverse drive contact 85 respectively. A resistor 88 in series with a capacitor 89 is connected across the contact connection to the two windings 86 and 87. Thus, with the relay common pole 83 connected to the forward drive contact 84, the forward drive winding 86 is connected directly across the a.c. power line while the winding 87 is connected across such lines in series with the resistor 88 and capacitor 89. Conversely, when the common pole 83 is connected with the reverse drive contact 85, the reverse driving winding 87 is connected directly across the power lines and the opposite winding 86 is connected across the power lines in series with the resistor 88 and the capacitor 89. This provides for the opposite rotation of the servomotor and a corresponding rotation positioning of the valve shaft 43 and the tap of potentiometer 17, as diagrammatically shown by the opposite extension of the motor shaft.

In the illustrated embodiment of the invention, the several components of the circuit may be tested through the opening of the test switch 66 and the selective connection of a d.c. power test supply directly into the circuit at appropriate points through a manually operated switch 90. Thus, in the illustrated embodiment of the invention, a d.c. test supply is provided via the common pole 91 of the switch 90 having a plurality of contacts, a first contact 92 is connected directly to the flow related input line to the differential amplifier network. This permits insertion of a preset flow simulated signal. A second contact 93 provides a corresponding input to the servo input line to the operational amplifier 72 directly to simulate the output of the feedback potentiometer 17. The third contact permits corresponding d.c. input to the input supply connection of the series parallel potentiometers 73 – 76 to energize amplifier 72 through the several calibration and adjustment potentiometers. A fourth contact 95 provides an input signal of the d.c. power supply connection. Fifth and sixth contacts 96 and 97 provide signals to the input and output sides of the detector transformer 58 of the flow related channel. A seventh contact 98 provides an input to the potentiometer 64.

In the operation of the illustrated embodiment of the circuit, the system is adjusted with a zero input signal to close the additive control valve 6 and position the servo potentiometer 17 at zero. The parts per million control potentiometer 64 is adjusted to introduce an additive in a desired proportion to a preselected flow rate. The energization of the feedback potentiometer 17 is adjusted through the calibration potentiometer 75, the span adjustment potentiometer 76 and the pressure preset potentiometer 74. Thus, the back pressure of the flow line is known and the voltage across the feedback potentiometer 17 is adjusted to vary the control signal in accordance with the pressure. This will provide for direct modification of the opening of the linear flow additive valve 6 to maintain precise amounts of additive flow through the flow line 3 for the known back pressure of the line 1. The calibration potentiometer 75 and the span potentiometer 76 provide the normal adjustment to the feedback potentiometer.

The linear additive valve 6 is then manually adjusted to establish the closure with the servo system at zero condition.

When flow is initiated, the turbine meter 7 will establish a proportionate signal which is converted into an alternating current signal and then detected by the transformer-rectifier network 54 – 57. The d.c. analog signal is amplified and applied across the parts per million potentiometer 64. The voltage at the tap 65 is amplified by the amplifier 67 and applied to the summing point via resistor 70. This signal is compared and summated with the output of the feedback amplifier 72 to establish an error signal to the servo-drive amplifier 69 corresponding to the algebraic sum appearing at the summing input point. The output is therefore either a positive or a negative voltage depending upon the relative amplitudes of the two input signals. If the output of the flow related signal is greater than that of the feedback signal, a positive signal is assumed to be established and operates the polarity sensitive relay 82 to close the forward contact 84 and correspondingly actuate the servomotor to drive the valve 6 in an opening direction. As the valve 6 opens, the tap 73 of the feedback potentiometer 17 is correspondingly changed to increase the input signal to the feedback amplifier 72 and thereby to the summing point until its signal balances the signal of the flow related signal input. At that point, the output of the servo amplifier 69 deenergizes the polarity sensitive relay 82 and the servomotor 16 stops and holds the linear valve 6 in the desired flow position. If the flow rate increases, thus indicating that more material must be added to maintain the desired proportionate rate of additive per unit of the main liquid, the input signal to the flow related amplifier 67 will increase, thereby correspondingly establishing a positive input signal to the polarity sensitive relay 82. The relay 82 will again close the forward contact 84 and provide power to drive the servomotor 16 to further open the valve 6.

If, for any reason, the main liquid flow rate decreases, the signal applied to potentiometer 64 decreases and the output of amplifier 67 correspondingly decreases. As a result, the output of the feedback amplifier 72 is relatively greater. The servo-drive amplifier 69 will then establish a relatively negative potential signal and actuates the polarity sensitive relay 82 to drive the common pole 83 into engagement with the valve closing or reverse contact 85. This energizes the servomotor 16 in the opposite direction resulting in a corresponding closing of the valve 6 and a resetting of the feedback potentiometer 17. The valve 6 thus closes until the feedback potentiometer 17 provides a related signal directly balancing the flow related signal thereby resulting in a deenergization of the polarity sensitive relay 82 and holding of the linear additive valve 6 in the proper flow position.

If, for any reason, the main flow decreases to a preselected minimum, the output signal of the amplifier 22 drops below the holding level of the main cutoff valve 20. This, in turn, terminates the feeding of additive flow and may simultaneously operate an alarm or other indication means, not shown.

Applicants have found that the concept of employing a linear valve and a simultaneously positioned feedback signal generator produces a very reliable means of accurately controlling the additive flow where the proportion of the additive is a very small proportion of the total flow. Very small changes in the pulse rate from the turbine meter 7 is rapidly and accurately sensed by the amplifiers 67 and 72 feeding the single summing point, with an automatic and direct corrective drive of the linear metering valve 6 to establish and maintain a continuous correction in the injection rate of the additive and one which will, therefore, closely maintain the desired rate of additive proportional to the variation in the flow rate of the main line. The present invention thus provides an essentially uniform and precise injection and dispersion rate of the additive within the main flow with a precise additive amount in the range of parts per million on a continuous basis.

Various modes of carrying out the invention are contemplated as being within the scope of the following claims, particularly pointing out and distinctly claiming the subject matter which is regarded as the invention.

I claim:

1. An additive metering system for supplying relatively minute quantities of a fluid material to a flowing liquid, comprising a means connected to meter said liquid and establishing a flow related signal, a linear metering valve coupling said fluid material to said flowing liquid, a servopositioning means coupled to said metering valve, a feedback signal means coupled to said positioning means, a comparator means having input means connected to said meter means and said feedback signal means and to a preset signal means and establishing a drive signal proportional to said flow related signal and said feedback signal, means connecting said comparator means to energize said positioning means in accordance with the drive signal to accurately position said linear metering valve in accordance with said drive signal, said and flow line being at a selected nominal pressure and including a pressure compensating signal means connected to said comparator means for compensating the preset signal of said preset signal means in accordance with the actual pressure in said flow line.

2. An additive metering system for supplying relative small quantities of an additive liquid to a flowing liquid, comprising a flow line, a signal means connected in said flow line to establish a flow related signal, a pressurized fluid additive liquid supply connected to said flow line, metering valve in said supply and having an opening control element to vary the valve opening, the flow through said valve opening varying linearly with the size of said valve opening, a servomotor coupled to said control element, a feedback signal means actuated by said servomotor, a comparator means having a preset signal means and connected to said meter means and said feedback signal means and establishing a drive signal proportional to the comparison of said preset signal, and said flow related signal and said feedback signal, means connecting said servomotor to said comparator means to energize said motor in accordance with said drive signal to accurately position said metering valve in accordance with said drive signal, and a pressure compensating signal means establishing a signal related to the pressure in said flow line and means connecting said pressure compensating signal means to said comparator means to modify said drive signal in accordance with that pressure in said flow line.

3. An additive metering system for supply relative small quantities of an additive liquid to a flowing liquid, comprising a flow line, a signal means connected in said flow line to establish a flow related signal, a pressurized fluid additive liquid supply connected to said flow line, metering valve in said supply and having an opening control element to vary the valve opening, the flow through said valve opening varying linearly with the size of said valve opening, a servomotor coupled to said control element, a feedback signal means actuated by said servomotor, a comparator means having a preset signal means and connected to said meter means and said feedback signal means and establishing a drive signal proportional to the comparison of said preset signal, and said flow related signal and said feedback signal, means connecting said servomotor to said comparator means to energize said motor in accordance with said drive signal to accurately position said metering valve in accordance with said drive signal, and a cutoff valve connected in said additive material supply and means connecting said cutoff valve to said comparator means and responsive to a selected minimum related signal to cut off said additive flow.

4. An additive metering system for supply relative small quantities of an additive liquid to a flowing liquid, comprising a flow line, a signal means connected in said flow line to establish a flow related signal, a pressurized fluid additive liquid supply connected to said flow line, metering valve in said supply and having an opening control element to vary the valve opening, the flow through said valve opening varying linearly with the size of said valve opening, a servomotor coupled to said control element, a feedback signal means actuated by said servomotor, a comparator means having a preset signal means and connected to said meter means and said feedback signal means and establishing a drive signal proportional to the comparison of said preset signal, and said flow related signal and said feedback signal, means connecting said servomotor to said comparator means to energize said motor in accordance with said drive signal to accurately position said metering valve in accordance with said drive signal, and said metering valve being a micrometer valve including a circular valve opening and a tapered shaft axially movable through said opening, said valve including a rotatable positioning shaft and a spring coupling said tapered shaft to said positioning shaft to axially position said tapered shaft in response to rotation of said positioning shaft, an axially adjustable coupling interconnecting said positioning shaft and said motor shaft to permit axial adjustment of said positioning shaft relative to said motor shaft.

5. An additive metering system for supplying relative small quantities of an additive liquid to a flowing liquid, comprising a flow line, a signal means connected in said flow line to establish a flow related signal, a pressurized fluid additive liquid supply connected to said flow line, metering valve in said supply and having an opening control element to vary the valve opening, the flow through said valve opening varying linearly with the size of said valve opening, a servomotor coupled to said control element, a feedback signal means actuated by said servomotor, a comparator means having a preset signal means and connected to said meter means and said feedback signal means and establishing a drive signal proportional to the comparison of said preset signal, and said flow related signal and said feedback signal, means connecting said servomotor to said comparator means to energize said motor in accordance with said drive signal to accurately position said metering valve in accordance with said drive signal, and said signal means generates a train of signal pulses having a repetition rate proportional to the flow, said comparator includes means establishing a direct current analog signal proportional to said repetition rate, and said feedback signal means establishes a corresponding direct current analog signal, said drive signal being a direct current signal having a polarity related to the relative amplitudes of said analog signals to correspondingly energize said servomotor to open and close said metering valves.

6. An additive metering system for supplying relatively minute quantities of a fluid material to a flowing liquid, comprising a means connected to meter said liquid and establishing a flow related signal, a linear metering valve coupling said fluid material to said flowing liquid, a servo-positioning means coupled to said metering valve, a feedback signal means coupled to said positioning means, a comparator means having input means connected to said meter means and said feedback signal means and to a preset signal means and establishing a drive signal proportional to said flow related signal and said feedback signal, means connecting said comparator means to energize said positioning means in accordance with the drive signal to accurately position said linear metering valve in accordance with said drive signal, and said fluid additive liquid is held in a pressurized tank under a preselected constant pressure, said signal means includes a pulse means forming a pulse train having a repetition rate corresponding to the flow rate, said metering valve includes a tapered control shaft axially movable into the valve opening said servomotor includes a rotatable motor shaft, an axially adjustable coupling connecting said control shaft to said motor shaft to permit independent axial movement therebetween, said comparator means including means to convert said pulse train to an analog signal, said feedback signal means including a potentiometer connected to said servomotor to establish a signal corresponding to the position of said control shaft.

7. The additive metering system of claim 6 including a pressure compensating signal means to establish compensating signals in accordance with the line pressure, and means connecting said pressure compensating signal means to said comparator means to modify said drive signal in accordance with said line pressure.

8. The additive system of claim 6 including a cutoff valve connected in said additive line, and means connecting said cutoff valve to said comparator means and responsive to a selected flow related signal to cut off flow in said additive flow line.

9. An additive metering system for supplying relatively minute quantities of a fluid material to a flowing liquid, comprising a means connected to meter said liquid and establishing a flow related signal, a linear metering valve coupling said fluid material to said flowing liquid, a servo-positioning means coupled to said metering valve, a feedback signal means coupled to said positioning means, a comparator means having input means connected to said meter means and said feedback signal means and to a preset signal means and establishing a drive signal proportional to said flow related signal and said feedback signal, means connecting said comparator means to energize said positioning means in accordance with the drive signal to accurately position said linear metering valve in accordance with said drive signal, and said fluid material is an additive liquid, and having a tank containing said additive liquid, a gas pressure line connected to said tank, a housing enclosing said means to meter the flowing liquid, said metering valve, said feedback signal means, said servo-positioning means and said comparator means, means releasably securing said tank to the housing, and conduit means connecting said tank to said metering valve.

10. The additive metering system of claim 9 having a sight glass means connected between said gas pressure line and said conduit means to provide a visual indication of the additive liquid in said tank.

* * * * *